Nov. 30, 1937. C. J. BECKWITH 2,100,624
INSULATING CONSTRUCTION
Filed Oct. 30, 1935
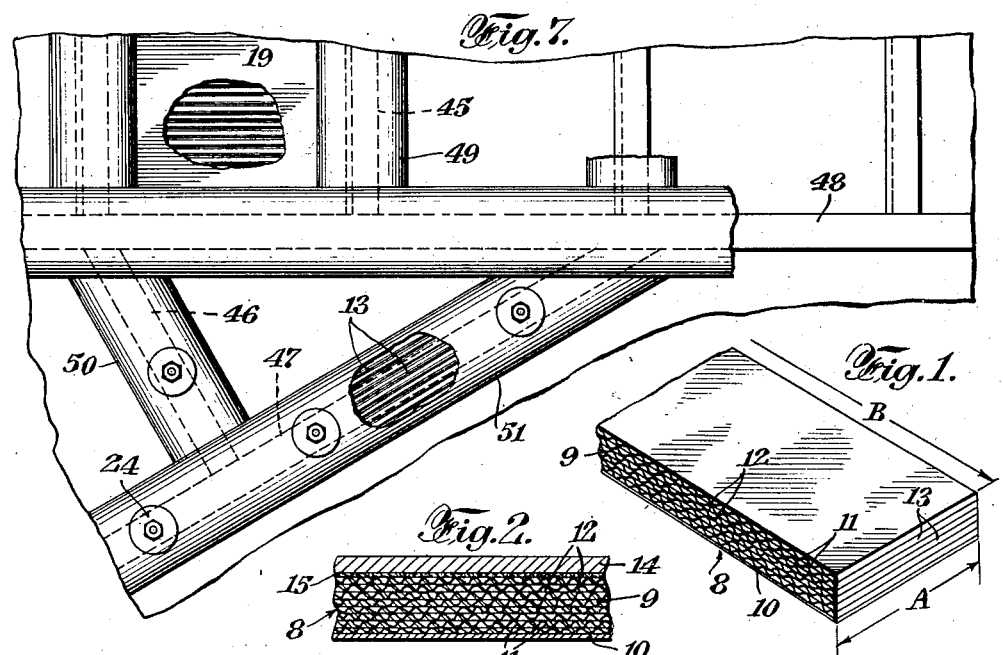
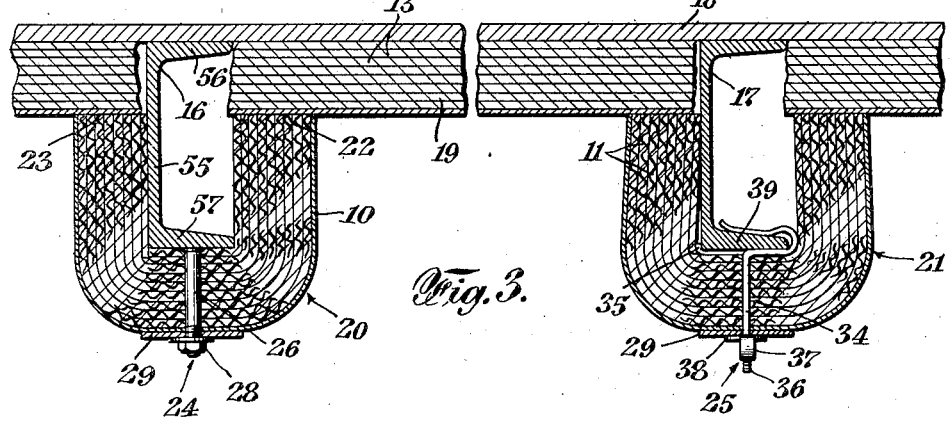
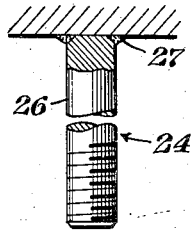
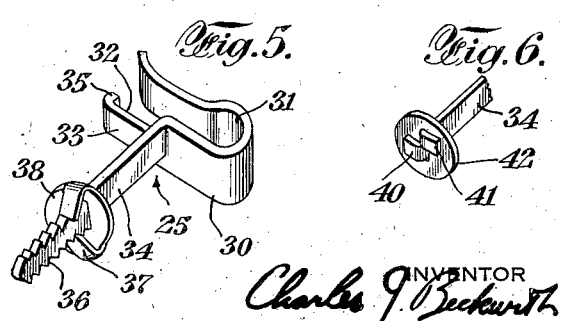

Patented Nov. 30, 1937

2,100,624

UNITED STATES PATENT OFFICE 2,100,624

INSULATING CONSTRUCTION

Charles J. Beckwith, Brooklyn, N. Y., assignor to Keasbey & Mattison Company, Ambler, Pa., a corporation of Pennsylvania Application October 30, 1935, Serial No. 47,358

5 Claims. (Cl. 20—4)

This invention relates to heat insulation and its application.

The object is to provide sheets of heat insulating, or fireproofing, material and a scheme for applying the same to partitions such as decks, walls or floors.

According to this invention there is provided and utilized a composite sheet of heat insulation composed of a relatively thick "air cell" layer having veneered to one face thereof a relatively thin layer of rigid fireproof material such as an asbestos cement composition. The air cell layer is composed of a soft flexible material comprising a plurality of corrugated fireproof sheets, the corrugations, or flutes, of which provide the air cells. The thin layer of rigid material veneered to one face serves to enhance the fireproof properties of the composite sheet and to add the strength and hardness required to adapt it for the assembly construction according to the invention.

The material and manner of application are particularly applicable to the fireproofing of steel decks on ships. In applying the insulation to beams, material according to the invention is molded into forms which fit the beams. These molded forms may be used to support the sheets covering the area between the beams. Special attaching means is provided for securing the molded forms to the beams.

The invention and its features will be better understood from the following detailed description of specific embodiments when considered with the accompanying drawing, of which Fig. 1 illustrates a sheet of composite fireproofing substance in accordance with this invention;

Fig. 2 illustrates a manner of gluing the composite sheet of Fig. 1 to a flat partition;

Fig. 3 illustrates, in section, a manner of applying the insulating substance to a partition supported by spaced channel beams;

Fig. 4 illustrates a threaded pin or stud welded to a surface, adapted to support the heat insulating material of Fig. 3;

Fig. 5 illustrates a form of fastening adapted to be applied to channel beams for the purpose of supporting the insulated material;

Fig. 6 shows a variation of the supporting device in Fig. 5; and

Fig. 7 illustrates the application of the heat insulating material to an irregularly shaped partition supported by channel beams, such as the deck of a ship.

The composite sheet 8 of heat insulation illustrated in Fig. 1 is composed of a relatively thick yielding layer 9 of an "air cell" fireproof material and a relatively thin layer 10 of a rigid fireproof material veneered to one surface of layer 9 by heavy glue or cement. The air cell layer 9 is composed of alternate corrugated sheets 11 and plane sheets 12 placed one on top of the other and glued together. The sheets are composed of a suitable yielding fireproof substance, preferably asbestos paper; and the air cells are constituted by the spaces between the corrugations of one sheet and the surface of the next sheet, which form flutes 13 extending along the dimension A. This air cell layer, which may conveniently be about 2 inches in thickness, is quite soft and yielding; and hence, if used alone, it would be subject to injury and would not be very well suited for open construction work. The rigid veneer layer 10, however, provides sufficient protection and strength to adapt the insulation for construction work. The thin layer 10 is of a rigid fireproof material such as a composition of asbestos fibre and Portland cement pressed into a layer which may conveniently be about $\frac{1}{16}$" thick. In the production of this composite fireproof sheet 8, the sheet is made in the form of long rectangular strips of which the longer dimension is parallel to B and the shorter dimension parallel to A, that is, along the flutes. The composite sheet has its greatest strength and rigidly in the direction of the flutes, along dimension A.

In accordance with this invention, it is contemplated to apply this composite sheet to partitions which should be fireproofed, such as a wall or floor. It is particularly applicable to the under side of ship decks, which are ordinarily of steel. The manner in which the sheet can be fastened to a partition will vary with the construction of the partition. A number of fastening schemes are illustrated in Figs. 2 to 7.

Fig. 2 shows a strip of the composite sheet 8 of Fig. 1 glued to the under side of a partition 14 such as a flat steel deck. A cementitious material is applied at 15 between the under side of the partition and the unveneered surface of the sheet. This gluing is particularly suitable in the case of small areas including no beams; but where complications exist, as in the case of larger areas, and areas transversed by supporting beams, other fastening schemes are preferable. Such other fastening schemes are illustrated in Figs. 3 to 7.

Fig. 3 shows the application of the composite heat insulating sheet 8 to the underside of a partition such as a floor or steel deck supported by channel beams. Two channel beams 16 and 17 each having a web 55 and upper and lower flanges 56 and 57, respectively, are shown supporting a steel deck or floor 18. Flat strips 19 of the fireproofing sheet 8 are fitted to the underside of the deck between the beams with the long dimension parallel to the beams and the flutes 13 extending crosswise between the beams to provide the greatest strength and rigidity. The unveneered surface is placed next to the under side of the deck, and the veneered surface away from the deck so that the rigid surface is exposed.

The channel beams 16 and 17 are covered by specially molded members 20 and 21, respectively, having a U-shaped cross section. These molded U-shaped members are made from the composite air cell material of Fig. 1, specially molded to fit the beams so that the sides of the U just clear the lower flange of the associated beam and the ends 22 and 23 abut against the under side of the strips 19. These abutting ends of the U's support the strips 19 against the underside of the deck, the stiff veneer sheets 10 at the outer surface of the U's abutting the veneer sheets of strips 19 and assuming a large proportion of the weight.

The U-shaped members are attached to the beams by special fastenings such as 24 or 25. Fastening 24 is shown in detail in Fig. 4, and fastening 25 in Fig. 5. Fastening 24 is composed of a stud 26 spot welded at 27 to the underside of the steel supporting member, which, in Fig. 3, is the flange 57 of beam 16. The stud extends through a suitable hole in the base of the U 20 and is provided at the end with a nut 28 and washer 29 for supporting the U.

The fastening 25 (Fig. 5) is formed from a strip of steel flat stock 30 bent to form a spring hook at 31 and cut lengthwise along 32 to form two strips 33 and 34. The shorter strip 33 has its end bent upward to form a lip 35. The longer strip 34 is bent perpendicular to strip 33 and is provided with teeth 36 along the edges at the end, to receive resilient lips 37 of a collar 38.

For the purpose of fastening the U-member 21 to the beam 17, the fastening member 25 is first fastened to the lower flange 39 of the channel beam. During this fastening operation the hook is forced over the flange with considerable force, and the upper and lower portions of the hook are sprung apart. When the fastening is in proper position the lip 35 engages the web of the beam, thereby holding the fastening to the beam. The strip 34 is then pushed through the base of the U; and collar 38 is pushed upwardly as far as possible and held in place by the resilient lips 37 engaging with the teeth 36.

Owing to the springiness of the hook 31, the weight of the U-member 21 and strips 19 are insufficient to pull the lip 35 away from the web of the beam; and the lip prevents the hook from sliding off the flange and injuring the yielding air-cell structure of the U-member.

Fig. 6 illustrates an alternate form which the ends of strips 34 of Fig. 5 may assume. Instead of teeth on the strip and spring lips on the washer, the end of the strip may be split into two parts 40 and 41 which may be bent oppositely under a flat washer or collar 42, as shown, after the U-member is in position on the beam.

The sides of the U-member 21 are slightly inclined inwardly toward the top; this slight inclination counteracts any tendency for the sides of the U's to spread apart, which spreading might allow the strips 19 to say or drop. By the use of inwardly inclined sides, the weight of strips 19 would tend to force the sides of the U inwardly instead of permitting them to spread outwardly. The U sides will not spread outwardly because to do that they would have to compress the strips 19. Since the possible inward movement of the U sides is limited by the channel beam, this construction may be more secure in some cases than in the case of U-member 20, which has parallel sides.

Fig. 7 is a view, from underneath, of an irregular flooring, such as a boat deck having irregular supporting beams, provided with heat insulation like that shown in Fig. 3. The construction comprises a number of parallel channel beams such as 45 and a number of other channel beams such as 46, 47 and 48 which meet at irregular angles. The flat surfaces of the flooring are covered by flat strips such as 19 cut to fit the dimensions. Molded members 49, 50, 51, etc. having U-shaped cross sections like those of Fig. 3 are applied to the channel beams and support the strips 19. Stud fastening means such as 24 are used but it will be understood that other of the suitable fastening means may be used instead. The U-members may have straight sides according to member 20 in Fig. 3, or inclined sides according to member 21 in Fig. 3.

It will be understood that the different types of fastenings may be used at any of the different areas of the heat insulation accordingly as may appear appropriate. If desired, more than one of the several types of fastenings may be used on the same partition.

The insulation is applicable to vertical or inclined walls or partitions as well as to horizontal partitions.

I claim:
1. Means for heat insulating a partition supported by a channel beam, which comprises a sheet of heat insulating substance covering said partition adjacent said beam, a molded U-shaped heat insulating form covering said beam, said U-shaped form having a side the end of which abuts and supports said sheet, and a fastener for fastening the base of said U-shaped form to a flange of said channel beam, said fastener comprising a spring hook for attaching to said flange and a stem which extends through said base, and a collar fastened to the bottom of said stem, for supporting said form against said beam.

2. Means for heat insulating a partition supported by a channel beam, which comprises a sheet of heat insulating substance covering said partition adjacent said beam, a molded U-shaped heat insulating form covering said U-shaped form having a side the end of which abuts and supports said sheet, and a fastener for fastening the base of said U-shaped form to a flange of said channel beam, said fastener comprising a spring hook for attaching to said flange and a stem, having teeth at the end thereof, which extends through the base of said form, and a collar having resilient lips which extends over the end of said stem to support said form against said beam, said lips engaging with said teeth.

3. Means for heat insulating a partition supported by a channel beam, which comprises a sheet of heat insulating substance covering said partition adjacent said beam, a molded U-shaped heat insulating form covering said beam, said U-shaped form having a side the end of which abuts and supports said sheet, and a fastener for fastening the base of said U-shaped form to a flange of said channel beam, said fastener comprising a spring hook for attaching to said flange and a stem which extends through the bottom of said U, and a collar fitted over the end of said stem, said end being split into a plurality of lips which may be bent against said washer to secure said form against said flange.

4. Means for heat insulating a partition supported by spaced beams, which comprises sheets of heat insulating substance covering said partition between said beams, a molded U-shaped heat insulating form covering each of said beams, the end of each side of said U-shaped forms abutting and supporting one of said sheets, and a fastener for fastening the base of each of said forms to the bottom of the beam which it covers, said insulating sheets comprising a relatively thick layer of air cell material formed by corrugated asbestos paper having veneered to the outer surface a relatively thin rigid layer of pressed asbestos and Portland cement.

5. Means for heat insulating a partition supported by spaced beams, which comprises sheets of heat insulating substance covering said partition between said beams, a molded U-shaped heat insulating form covering each of said beams, the end of each side of said U-shaped forms abutting and supporting one of said sheets, and a fastener for fastening the base of each of said forms to the bottom of the beam which it covers, said insulating sheets comprising layers of corrugated asbestos paper fastened together with adhesive with the flutes formed by the corrugations extending from one beam to the next.

CHARLES J. BECKWITH.